United States Patent [19]

Mory

[11] 3,963,693
[45] June 15, 1976

[54] QUINOLONE AZO BARBITURIC ACID PIGMENTS

[75] Inventor: Rudolf Mory, Dornach, Switzerland

[73] Assignee: Ciba-Geigy Corporation, Ardsley, N.Y.

[22] Filed: Apr. 22, 1974

[21] Appl. No.: 462,834

[30] Foreign Application Priority Data

May 3, 1973  Switzerland.......................... 6321/73

[52] U.S. Cl......................... 260/154; 106/23; 106/193 P; 106/204; 106/288 Q; 260/42.21; 260/251 R; 260/257; 260/260; 260/289 R; 260/764

[51] Int. Cl.².................... C09B 29/36; D06P 1/08; D06P 3/24; D06P 3/60

[58] Field of Search................. 260/154, 155, 146 D

[56] References Cited
UNITED STATES PATENTS

| | | | |
|---|---|---|---|
| 2,140,987 | 12/1938 | Dickey | 260/154 X |
| 2,283,220 | 5/1942 | McNally et al. | 260/155 |
| 2,827,451 | 3/1958 | Towne et al. | 260/154 |
| 2,839,523 | 6/1958 | Towne et al. | 260/155 |

*Primary Examiner*—Floyd D. Higel
*Assistant Examiner*—John J. Doll
*Attorney, Agent, or Firm*—Vincent J. Cavalieri

[57] ABSTRACT

Monoazo pigments of the formula

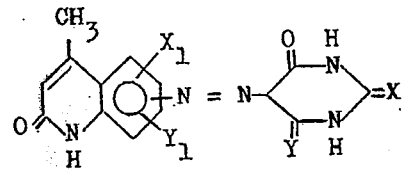

wherein X denotes an O or S atom or an imino group, Y denotes an O atom or an imino group, and $X_1$ and $Y_1$ denote H or halogen atoms, or alkyl or alkoxy groups are prepared. The pigments are useful for coloring plastics such as polycarbonates, polystyrene, and polyvinylchloride in fast yellow to red shades.

5 Claims, No Drawings

QUINOLONE AZO BARBITURIC ACID PIGMENTS

It has been found that valuable new monoazo pigments of the formula

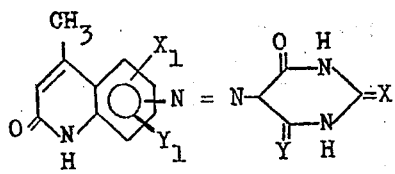

wherein X denotes an O or S atom or an imino group, Y denotes an O atom or an imino group, and $X_1$ and $Y_1$ denote H or halogen atoms, or alkyl or alkoxy groups containing 1–4 C atoms, are obtained when a diazo compound of an amine of the formula

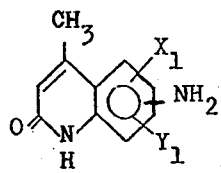

is coupled with a compound of the formula

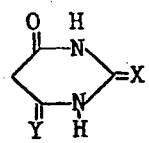

in which formula X, Y, $X_1$ and $Y_1$ have the abovementioned meaning.

Particular interest attaches to monoazo pigments of the formula

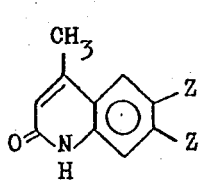

wherein one of the radicals Z denotes a group of the formula

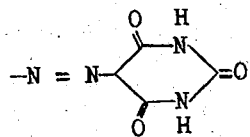

and the other denotes a H or halogen atom, or an alkyl or alkoxy group containing 1–4 C atoms.

Since the dyestuffs according to the invention are pigments, groups which confer solubility in water, in particular acid groups which confer solubility in water, such as sulphonic acid or carboxylic acid groups, must of course not be present.

The diazo components used are preferably compounds of the formula

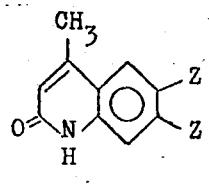

wherein one Z denotes an amino group and the other denotes a H or halogen atom, or an alkyl or alkoxy group containing 1–4 C atoms.

The following amino-quinolones may be mentioned as examples: 4-methyl-6-amino-quinolone-2, 4-methyl-6-amino-7-chloro-quinolone-2, 4-methyl-6-amino-8-chloro-quinolone-2, 4,7-dimethyl-6-amino-quinolone-2, 4,8-dimethyl-6-amino-quinolone-2, 4,5,8-trimethyl-6-amino-quinolone-2, 4-methyl-6-amino-7-methoxy-quinolone-2, 4-methyl-6-amino-5,8-dimethoxy-quinolone-2, 4-methyl-7-amino-quinolone-2, 4-methyl-7-amino-6-chloro-quinolone-2, 4,6-dimethyl-7-amino-quinolone-2, 4,8-dimethyl-7-amino-quinolone-2 and 4-methyl-7-amino-6-methoxy-quinolone-2.

These diazo components are known compounds.

Barbituric acid may in particular be mentioned as the coupling component; in addition, its functional derivatives can also be used, for example the thio and imino derivatives of the formula

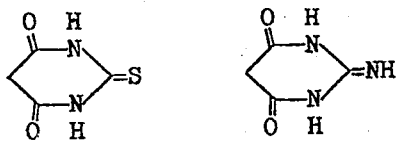

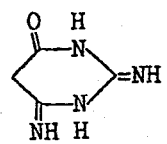

These barbituric acid derivatives are known compounds.

The coupling is suitably carried out by gradual addition of the aqueous diazonium salt solution to the solution of the coupling component in a water-miscible organic solvent such as, for example, dimethylformamide, or by gradual addition of the aqueous-alkaline solution of the coupling component to the acid solution of the diazonium salt. The coupling is suitably carried out at a pH value of 4 to 6.

The pH value is advantageously adjusted by addition of a buffer. Buffers which can be used are, for example, the salts, especially the alkali metal salts, of formic acid, phosphoric acid or, especially, acetic acid. The alkaline solution of the coupling component suitably contains a wetting agent, dispersing agent or emulsifier, for example an aralkylsulphonate, such as dodecylbenzenesulphonate or the sodium salt of 1,1'-naphthylmethanesulphonic acid, polycondensation products of alkylene oxides, such as the reaction product of ethylene oxide with p-tert.-octylphenol and also alkyl esters of sulphoricinoleates, for example n-butyl sulphoricinoleate. The dispersion of the coupling component can also advantageously contain protective colloids, for example methylcellulose or minor amounts of inert sparingly water-soluble or water-insoluble organic solvents, for example optionally halogenated or nitrated aromatic hydrocarbons, such as benzene, toluene, xylene, chlorobenzene, dichlorobenzenes or nitrobenzene, as well as aliphatic halogenated hydrocarbons such as, for example, carbon tetrachloride or trichloroethylene, and also water-miscible organic solvents, such as acetone, methyl ethyl ketone, methanol, ethanol or isopropanol, especially dimethylformamide.

By virtue of their insolubility, the pigments obtained can be isolated from the reaction mixtures by filtration. It proves to be advantageous to after-treat the resulting pigments with an organic solvent which preferably boils above 100°C. Benzenes substituted by halogen atoms, alkyl groups or nitro groups, such as xylenes, chlorobenzene, o-dichlorobenzene or nitrobenzene, and also pyridine bases, such as pyridine, picoline or quinoline, as well as ketones, such as cyclohexanone, ethers, such as ethylene glycol monomethyl ether or monoethyl ether, amides, such as dimethylformamide or n-methylpyrrolidone, and also dimethylsulphoxide, prove to be particularly suitable.

The after-treatment is preferably carried out by heating the pigment, in the solvent, to 100°–250°C, whereupon a coarsening of the particle size occurs in many cases, this having a favourable effect on the fastness to light and to migration of the pigments obtained.

The coupling can also advantageously be carried out by continuously combining an acid solution of the diazonium salt with an alkaline solution of the coupling component in a mixing nozzle, whereupon immediate coupling of the components takes place. The resulting dyestuff dispersion is continuously withdrawn from the mixing nozzle and the dyestuff is separated off by filtration.

Instead of the diazonium salts, the corresponding diazoamino compounds can also be used. These are obtained according to a known process by coupling an aryldiazonium salt with a primary amine or preferably with a secondary amine. The most diverse amines are suitable for this purpose, for example aliphatic amines such as methylamine, ethylamine, ethanolamine, propylamine, butylamine, hexylamine and especially dimethylamine, diethylamine, diethanolamine, methylethanolamine, dipropylamine or dibutylamine, aminoacetic acid, methylaminoacetic acid, butylaminoacetic acid, aminoethanesulphonic acid, methylaminoethanesulphonic acid, guanylethanesulphonic acid, β-aminoethylsulphuric acid, alicyclic amines, such as cyclohexylamine, N-methylcyclohexylamine and dicyclohexylamine, aromatic amines, such as 4-aminobenzoic acid, sulphanilic acid, 4-sulpho-2-aminobenzoic acid, (4-sulphophenyl)-guanidine, 4-N-methylaminobenzoic acid, 4-ethylaminobenzoic acid, 1-aminonaphthalene-4-sulphonic acid, 1-aminonaphthalene-2,4-disulphonic acid, heterocyclic amines, such as piperidine, morpholine, pyrrolidine and dihydroindole, and finally also sodium cyanamide or dicyandiamide.

As a rule, the diazoamino compounds obtained are sparingly soluble in cold water and can, if necessary after salting out, be separated in a crystalline form from the reaction medium. In many cases, the moist press cakes can be used for the further reaction. In some cases, it can prove desirable to dehydrate the diazoamides by vacuum drying prior to the reaction.

The coupling of the diazoamino compounds with the coupling component is carried out in an organic solvent, for example chlorobenzene, o-dichlorobenzene, nitrobenzene, pyridine, ethylene glycol, ethylene glycol monoethyl ether or monomethyl ether, dimethylformamide, formic acid or acetic acid.

If water-miscible solvents are used it is not necessary to use the diazoamino compounds in an anhydrous form. For example, the water-moist filter cakes can be used.

The coupling is suitably carried out under warm conditions, preferably at temperatures between 80° and 180°C, in an acid medium, and in general takes place very rapidly and completely. If neutral solvents are used, the addition of an acid, for example hydrogen chloride, sulphuric acid, formic acid or acetic acid, is of advantage. Because of their insolubility, the pigments obtained can be isolated from the reaction mixture by filtration. An after-treatment with organic solvents, such as is necessary in the case of pigments which are obtained by the aqueous coupling method, is therefore unnecessary in most cases.

Finally, the coupling can also be completed by suspending the amine to be diazotised, together with the coupling component, in the molar ratio of 1:1, in an organic solvent and treating the mixture with a diazotising agent, especially an ester of nitrous acid, such as methyl nitrite, ethyl nitrite, butyl nitrite, amyl nitrite or octyl nitrite.

The new dyestuffs are valuable pigments which can be used in a finely divided form, for pigmenting high molecular organic material, for example cellulose ethers and cellulose esters, such as ethylcellulose, nitrocellulose, cellulose acetate, cellulose butyrate, natural resins or synthetic resins, such as polymerisation resins or condensation resins, for example aminoplasts, especially urea-formaldehyde and melamineformaldehyde resins, alkyd resins, phenoplasts, polycarbonates, polyolefines, such as polystyrene, polyvinyl chloride, polyethylene, polypropylene, polyacrylonitrile, polyacrylic acid esters, polyamides, polyurethanes or polyesters, rubber, casein, silicone and silicone resins, individually or as mixtures.

It is immaterial whether the high molecular compounds mentioned are in the form of plastic masses or melts or in the form of spinning solutions, lacquers, paints or printing inks. Depending on the end use, it proves to be advantageous to use the new pigments as toners or in the form of preparations.

In the examples which follow the parts, unless otherwise stated, denote parts by weight and percentages denote percentages by weight.

EXAMPLES 1 – 9

20.85 parts of 4-methyl-6-amino-7-chloro-quinolone-(2) in a mixture of 400 parts by volume of glacial acetic acid, 400 parts by volume of water and 25 parts by volume of concentrated hydrochloric acid are diazotised with 25 parts by volume of 4 N sodium nitrite solution at 0°–5°C over the course of approx. 15 minutes. This diazo solution is then poured in a thinstream into a solution of 12.8 parts of barbituric acid in 1,000 parts by volume of dimethylformamide, to which 30 parts of anhydrous sodium acetate have also been added. The coupling takes place immediately. The mixture is stirred for some hours longer at room temperature and the pigment formed is then filtered off, washed with hot water and methanol and dried. 30 parts of a hard, orange-coloured product are obtained.

To obtain a tinctorially usable pigment, the coupling product, in 1,300 parts by volume of N-methylpyrrolidone, is heated to the boil for 30 minutes. After cooling, the pigment is separated off by filtration, washed with methanol and dried. 27 parts of a yellow soft pigment powder are obtained. The pigment has the following structure:

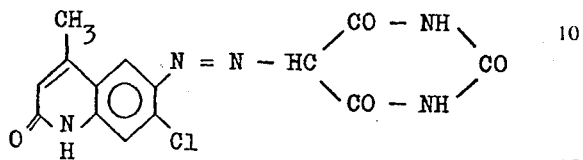

It colours polyvinyl chloride in a very deep pure yellow shade with very good fastness to migration and good fastness to light.

The table which follows contains further pigment dyestuffs which have been obtained in the manner indicated. Column I indicates the diazo base and column II the coupling component and column III shows the colour shade of the polyvinyl chloride coloured with the pigment.

wherein X is O, S, or imino; Y is O or imino; and $X_1$ and $Y_1$ are hydrogen, chloro, alkyl containing 1–4 carbon atoms, or alkoxy containing 1–4 carbon atoms.

2. A monoazo pigment according to claim 1 of the formula

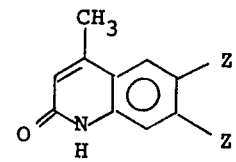

wherein one of the radicals Z is

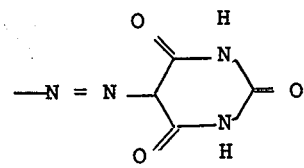

and the other is hydrogen, chloro, alkyl containing 1–4 carbon atoms, or alkoxy containing 1–4 carbon atoms.

| Example | I | II | III |
|---|---|---|---|
| 2 | 4-methyl-7-amino-quinolone-(2) | barbituric acid | yellow |
| 3 | 4,8-dimethyl-7-amino-quinolone-(2) | '' | yellow |
| 4 | 4,6-dimethyl-7-amino-quinolone-(2) | '' | orange |
| 5 | 4-methyl-6-methoxy-7-amino-quinolone-(2) | '' | red |
| 6 | 4-methyl-6-chloro-7-amino-quinolone-(2) | '' | yellow |
| 7 | 4-methyl-7-chloro-6-amino-quinolone-(2) | 2-thiobarbituric acid | yellow-red |
| 8 | 4-methyl-6-chloro-7-amino-quinolone-(2) | '' | yellow |
| 9 | 4-methyl-6-methoxy-7-amino-quinolone-(2) | 2,4-diiminobarbituric acid | brown-red |

EXAMPLE 10

65 parts of stabilised polyvinyl chloride, 35 parts of dioctyl phthalate and 0.2 part of the dyestuff obtained according to Example 1 are stirred together and then milled for 7 minutes at 140°C on a twin-roll calender. A yellow-coloured sheet of very good fastness to light and fastness to migration is obtained.

EXAMPLE 11

1.00 g of the pigment prepared according to Example 1 is finely ground on an Engelsmann grinder with 4.00 g of printing varnish composed of 29.4% of linseed oil/stand oil (300 poise), 67.2% of linseed oil/stand oil (20 poise), 2.1% of cobalt octoate (8% Co) and 1.3% of lead octoate (24% Pb), and the mixture is then printed at the rate of 1 g/m² onto art printing paper by the letterpress printing process, using a printing block. A strong pure yellow shade of good transparency and good gloss is obtained. In three-colour or four-colour printing, very brilliant green shades can be produced by overprinting on blue.

The pigment is also suitable for other printing processes, such as gravure printing, offset printing and flexographic printing and here again gives very good results.

I claim:

1. A monoazo pigment of the formula

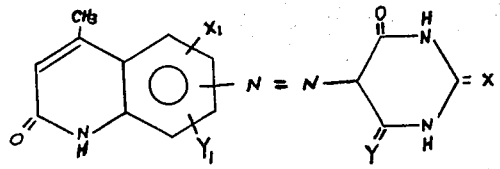

3. The compound according to claim 1 of the formula

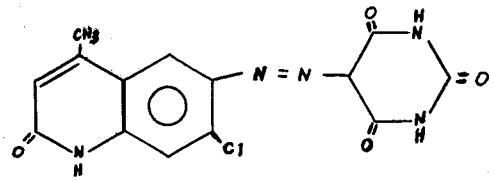

4. The compound according to claim 1 of the formula

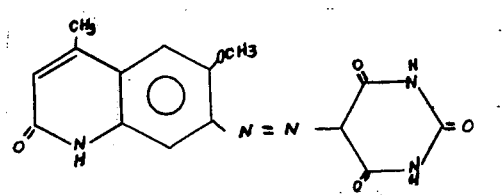

5. The compound according to claim 1 of the formula

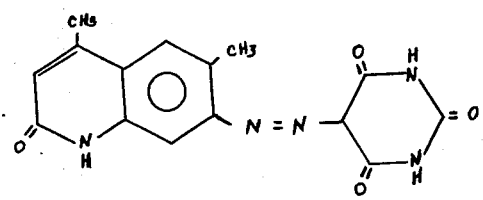

* * * * *